United States Patent
Morimoto

(10) Patent No.: US 7,499,697 B2
(45) Date of Patent: Mar. 3, 2009

(54) PORTABLE TERMINAL DEVICE FOR DIVERTING ONE-TIME ONLY CALLS

(75) Inventor: Yoichi Morimoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/785,262

(22) Filed: Feb. 24, 2004

(65) Prior Publication Data
US 2004/0240634 A1 Dec. 2, 2004

(30) Foreign Application Priority Data
May 26, 2003 (JP) ............................. 2003-148319

(51) Int. Cl.
*H04L 12/58* (2006.01)
(52) U.S. Cl. ................ 455/412.1; 455/415; 379/201.07; 379/201.09
(58) Field of Classification Search ................ 455/415, 455/412.1; 379/88.19, 201.07, 201.09
See application file for complete search history.

(56) References Cited

U.S. PATENT DOCUMENTS

| | | | | |
|---|---|---|---|---|
| 5,065,427 | A | * | 11/1991 | Godbole ................. 379/100.15 |
| 5,206,900 | A | * | 4/1993 | Callele ................... 379/142.06 |
| 6,026,152 | A | * | 2/2000 | Cannon et al. .......... 379/142.06 |
| 6,377,795 | B1 | * | 4/2002 | Bach et al. .................... 455/417 |
| 6,748,068 | B1 | * | 6/2004 | Walsh et al. ............ 379/142.03 |
| 2002/0085690 | A1 | * | 7/2002 | Davidson et al. .......... 379/88.17 |
| 2002/0114431 | A1 | * | 8/2002 | McBride et al. .......... 379/88.21 |

FOREIGN PATENT DOCUMENTS

| | | |
|---|---|---|
| JP | 09261335 | 10/1997 |
| JP | 2000-312256 | 11/2000 |
| JP | 2001061001 | 3/2001 |
| JP | 3353890 | 12/2002 |
| JP | 2003125066 | 4/2003 |

OTHER PUBLICATIONS

Notice of Reason for Rejection with translation, dated Jan. 22, 2008, for the corresponding Japanese Application JP 2003-148319.
Notice of Reason for Rejection with translation, dated Jan. 22, 2008, for the corresponding Japanese Application JP 2003-148319.
Decision of Rejection, dated Oct. 7, 2008, for the corresponding Japanese Patent Application JP 2003-148319.

* cited by examiner

*Primary Examiner*—Alexander Eisen
*Assistant Examiner*—Justin Y Lee
(74) *Attorney, Agent, or Firm*—Katten Muchin Rosenman LLP

(57) ABSTRACT

The present invention relates to the one-time only call preventing device of a portable telephone set, and it particularly aims to provide a device preventing one-time only calls without answering to an unpleasant call by charging its originator for a one-time only call. For example, if a one-time only call arrives, a telephone directory database is retrieved. If the originating number of the one-time only call is not registered in the telephone directory database, or if the number is for a call set to a zero-calling time even though it is registered in the telephone directory database, the one-time only coping process of the present invention is performed. By adopting such a configuration, one-time only calls can be prevented and also answering to such unpleasant calls can be done without.

6 Claims, 4 Drawing Sheets

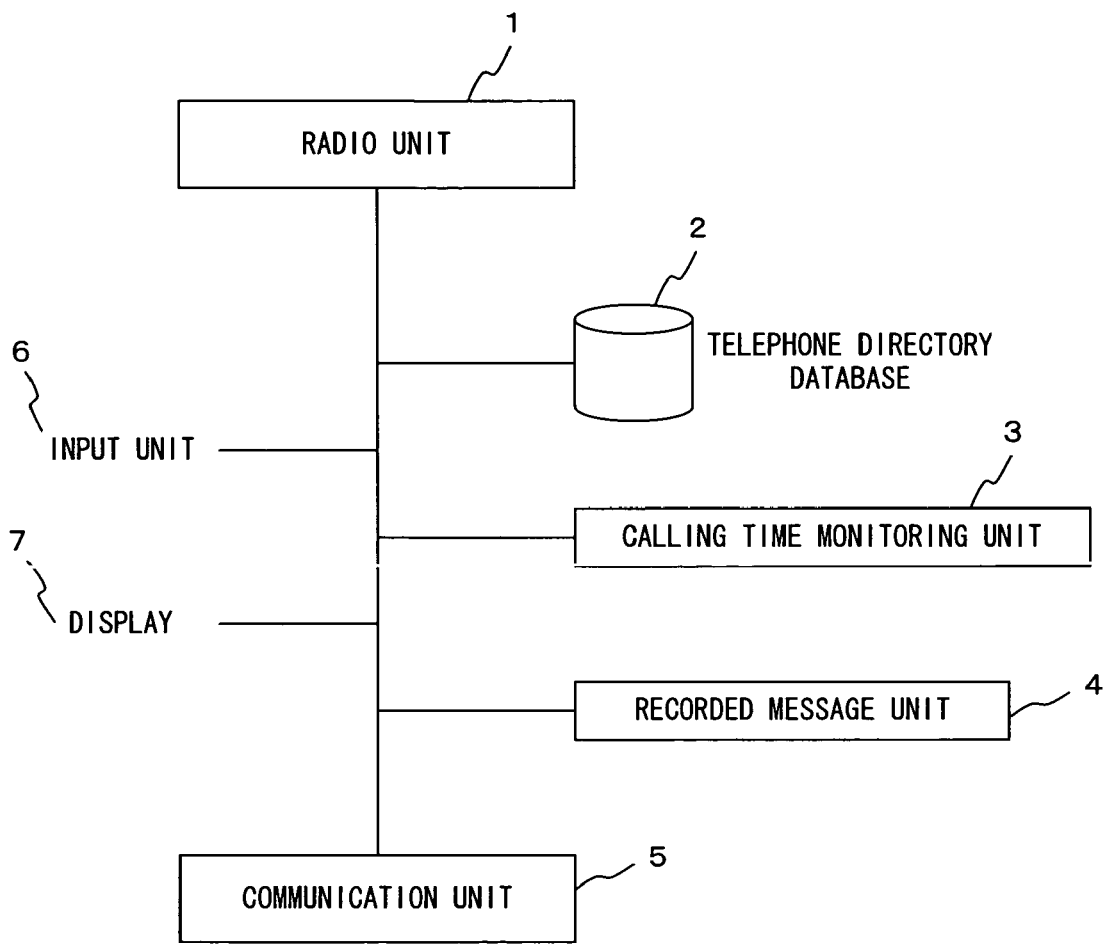
F I G. 1

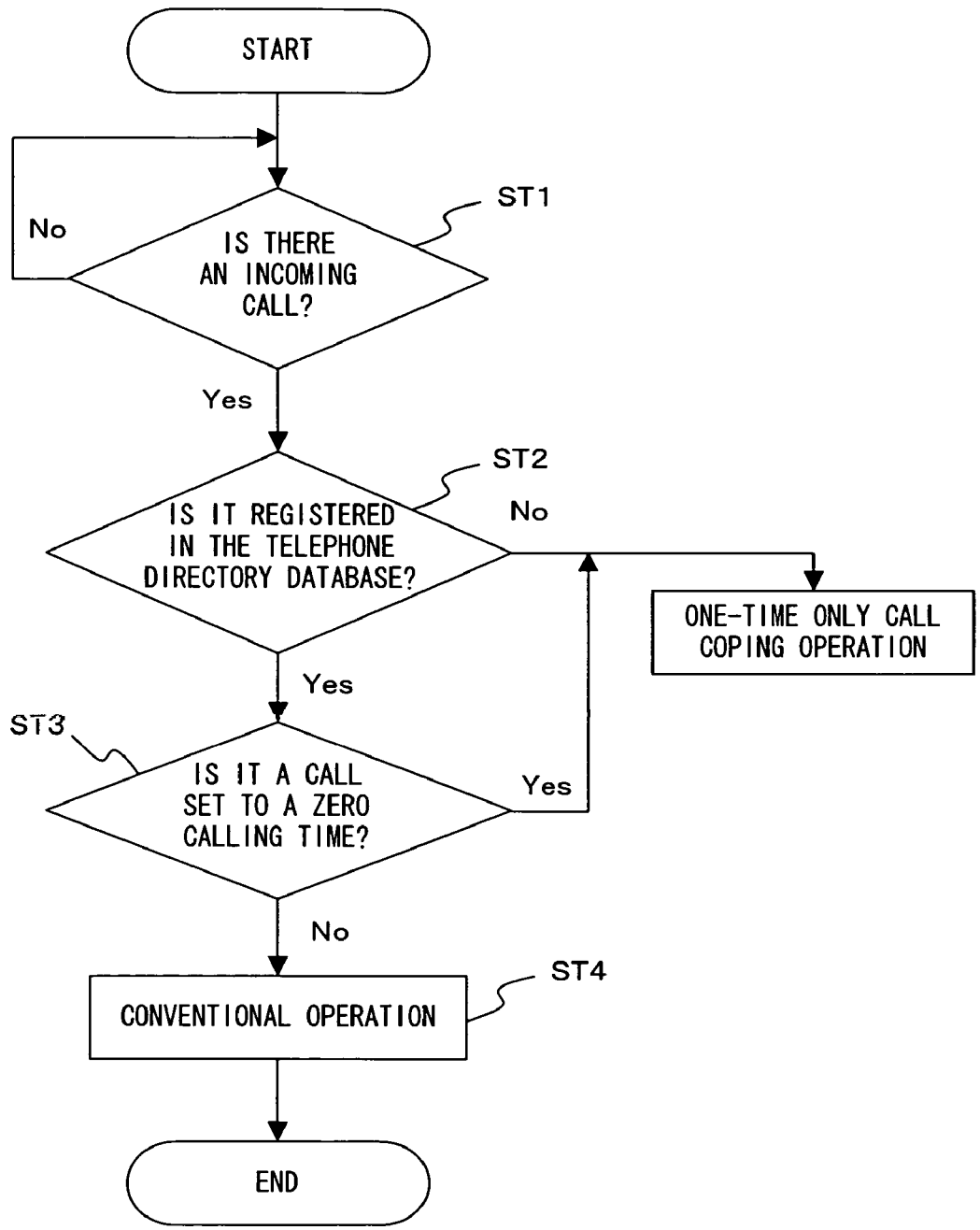
F I G. 2

TELEPHONE DIRECTORY No;
NAME
READING
GROUP
PHONE NUMBER 1
PHONE NUMBER 2
PHONE NUMBER 3
MAIL ADDRESS 1
MAIL ADDRESS 2
MAIL ADDRESS 3
RECORDED MESSAGE RESPONSE TIME; / / TIME BETWEEN THE ARRIVAL OF A CALL AND
                                               / / THE ANNOUNCEMENT OF A RECORDED MESSAGE

F I G. 4

PORTABLE TERMINAL DEVICE FOR DIVERTING ONE-TIME ONLY CALLS

BACKGROUND OF THE INVENTION

1. Field of the Invention

The present invention relates to a portable terminal device, such as a cellular phone, a PHS (personal handy-phone system) and the like.

2. Description of the Related Art

Recently so-called one-time only calls have been causing many troubles. For example, when we call to a phone number recorded in the incoming call history of a cellular phone, it is found to be a sort of invitation call, such as two-shot dial, etc. In such a case, a communication fee is charged. Furthermore, if the cellular phone is not set in a manner mode, a receiver must answer to an unpleasant call.

Japanese Patent Laid-open No. 2000-312256 discloses a method for refusing communication as a method for preventing troublesome calls, such as a one-time only call, etc. For example, a cellular phone is in advance provided with a means for recording the phone numbers of calls to be refused. If one-time only calls arrive at the cellular phone, their calling numbers are sequentially recorded in the recording means. If there is an incoming call from the same phone number, the call is automatically disconnected.

However, in the conventional communication refusing method, a receiver must still answer to an unpleasant call. In the conventional method, such calls are simply recorded in its incoming history. Furthermore, the originator of such a one-time only call is never charged.

SUMMARY OF THE INVENTION

It is an object of the present invention to provide a one-time only call preventing device for substantially preventing one-time only calls, in which a receiver need not answer to an unpleasant call and that the originator of such a one-time only call is charged.

Specifically, according to the present invention, the objective can be achieved by providing a portable terminal device comprising a determination unit retrieving data from a telephone directory database when a call arrives at the portable terminal device and determining whether the originating number is registered in the telephone directory database and a transmitting unit immediately connecting the call if the originating number is not registered in the telephone directory database, and announcing a recorded message.

When a call arrives at the portable terminal device, the determination unit immediately retrieves data from the telephone directory database, and if the calling number is not registered in the telephone directory database, it immediately connects the call to the recorded message. By adopting such a configuration, if there is a one-time only call, the call is automatically connected to the recorded message and its originator is charged. In this way, an economic burden can be imposed on the originator to substantially prevent the originator from making one-time only calls.

If the originating number is registered in the telephone directory database, the telephone directory database is further retrieved. If the originating number is a number of one-time only calls recorded message is announced as soon as it is received, the call is immediately connected and such a recorded message is announced to the originator. By adopting such a configuration, the one-time only call from the number registered in the telephone directory database can also be prevented using the call history information of its originator.

The zero-calling time setting is made in a recorded message response time area of the telephone directory database. By adopting such a configuration, a one-time only call from such an originator can be automatically connected to a cellular phone.

Furthermore, the above-mentioned connection is made before a calling tone is generated. By adopting such a configuration, if a call is determined to be one-time only call, the owner of the cellular phone never answers to such an unpleasant call since the calling tone is not generated.

BRIEF DESCRIPTION OF THE DRAWINGS

FIG. 1 shows the system configuration of the one-time only call preventing device of the preferred embodiment;

FIG. 2 is a flowchart showing the process of the preferred embodiment;

FIG. 4 shows the configuration of the telephone directory database.

DESCRIPTION OF THE PREFERRED EMBODIMENT

Figure 3:
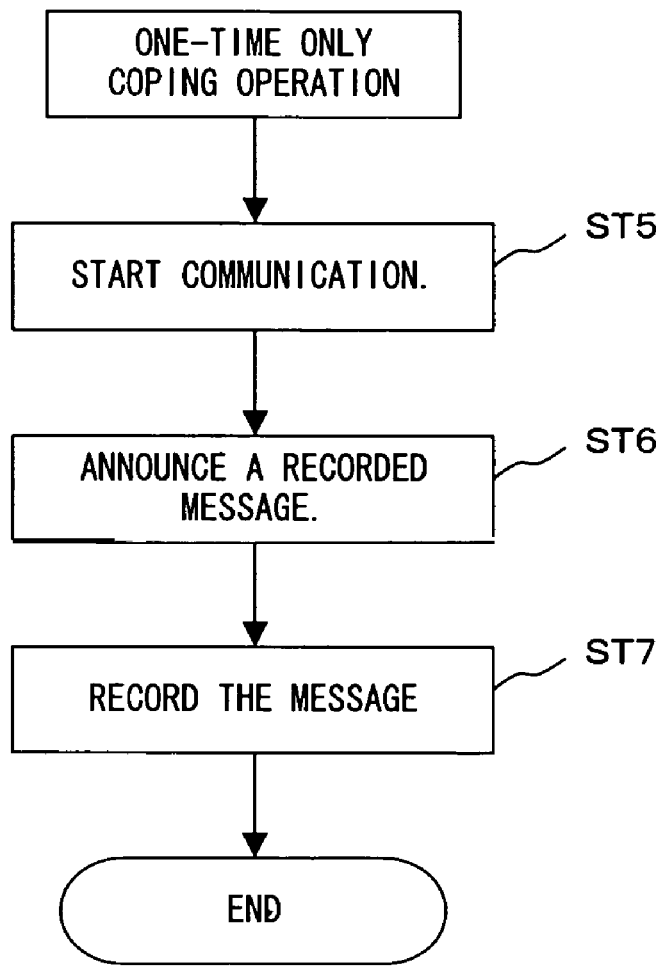
FIG. 3 is a flowchart showing the one-time only call coping process of the preferred embodiment.

The preferred embodiment of the present invention is described in detail below with reference to the drawings.

FIG. 1 shows the system configuration of the one-time only call preventing device of the preferred embodiment, and FIGS. 2 and 3 are flowcharts showing the process of the preferred embodiment.

In FIG. 1, this system comprises a radio unit 1, a telephone directory database 2, a calling time monitoring unit 3, a recorded message unit 4 and a communication unit 5. Furthermore, the cellular phone comprises an input unit 6 inputting operation signals according to the operation of input keys and a display unit 7 displaying a phone number, etc. The above-mentioned units are connected to each other by a bus.

The radio unit 1 is an interface (I/F) for connecting the cellular phone to its base station to communicate, and it processes according to a predetermined protocol. The calling time monitoring unit 3 monitors a time between the arrival of a call and the issuance of a calling tone, and a calling time. The recorded message unit 4 stores a message to be announced to an originator if a call is a one-time only call, and records a message from the originator. The communication unit 5 controls communication conducted between the originator and the owner of the cellular phone.

The input unit 6 inputs the operation signals of input keys, such as ten keys, function keys, etc. The display unit 7 displays, for example, a phone number registered in the telephone directory database.

The telephone directory database 2 has the configuration shown in FIG. 4. The database 2 stores information about a telephone directory number, a name, etc., and also stores information about a one-time only call originator. In FIG. 4, the telephone directory database comprises a telephone directory number, a name, reading, a group, phone numbers, mail addresses and a recorded message response time, and stores information corresponding to each area. In FIG. 2, three phone number areas 1 though 3 and three mail address areas 1 through 3 are provided assuming there are a plurality of phone numbers and a plurality of mail addresses.

The recorded message response time area stores a time between the arrival of a call and the announcement of a recorded message. If there is an incoming call, the telephone directory database is retrieved using the originating number, and a recorded message response time is set by referring to the recorded message response time of a corresponding name stored in the telephone directory database.

For example, in this preferred embodiment, if a call is a one-time only call, a recorded message is set so as to be immediately announced. However, this setting is not limited to a zero calling time, and it can be set to another time period. Even if a call is not a one-time only call, the response time between the arrival of a call to the announcement of a recorded message can be freely set.

The process operation of this preferred embodiment with such a configuration is described below with reference to FIGS. 2 and 3.

Firstly, in FIG. 2, it is determined whether a call arrives at a cellular phone (step (hereinafter called "ST") 1). If there is no incoming call, the process waits for an incoming call (no in ST1). Then, if a call arrives (yes in ST1), the telephone directory database 2 is retrieved and it is determined whether the originating number is registered in the telephone directory database 2 (ST2).

As described earlier, the telephone directory database 2 stores phone numbers with zero calling time setting in order to cope with one-time only calls as well as ordinary phone numbers, and it determines whether a phone number is registered in the telephone directory database. Specifically, the database 2 compares the originating number of the incoming call with each phone number stored in the telephone directory database 2. If there is a phone number that coincides with the originating number, it is determined that the originating number is registered (yes in ST2).

If the calling number is registered (yes in ST2), it is further determined whether the originating number is a number with zero-calling time setting (ST3). In other words, it is determined whether the phone number is previously registered for a one-time only call. If the originating number is not a number with zero-calling time setting (no in ST3), it is determined to be a call from an ordinary originator registered in the telephone directory database 2 and is processed in the conventional way (ST4). For example, after a calling tone is generated several times during its set time under the control of the calling time monitoring unit 3, the process proceeds to the announcement of a recorded message and the like.

If in the earlier-mentioned determination (ST3), the phone number is a number with zero-calling time setting (yes in ST3), the process proceeds to the one-time only call coping operation of this preferred embodiment. If in the earlier-mentioned process (ST2), there is no corresponding phone number in the telephone directory database 2 (no in ST2), the process also immediately proceeds to the one-time only call coping operation.

FIG. 3 is a flowchart showing the above-mentioned one-time only call coping process. In FIG. 3, firstly, communication is started (ST5). In this case, as soon as a one-time only call arrives, mode is switched to the communication mode, and a recorded message is announced (ST6). This message is read from the recorded message unit 4 and is announced to the originator through the radio unit 1.

Therefore, the telephone set of an originator that has originated a one-time only call is immediately connected to the cellular phone of this preferred embodiment and a recorded message is announced. In other words, the originator is charged. Then, a message from the originator is recorded (ST7), and the receiving process of the one-time only call terminates.

As described above, according to this embodiment, if a one-time only call is originated, the originator of the call is always connected to the cellular phone, a recorded message is announced from the cellular phone, and the originator is always charged. Therefore, a one-time only call imposes an economic burden on the originator, thus substantially preventing one-time only calls.

According to this preferred embodiment, the above-mentioned process is completed before a calling tone is generated. Therefore, if a one-time only call arrives at the cellular phone, no calling tone is generated, and a user need not answer to an unpleasant call.

In the above-mentioned preferred embodiment, after a recorded message is announced, the process proceeds to the recording of a message from the originator. However, since it is not always necessary for the process to proceed to the recording of the message from the originator, the process can also be terminated after the message is announced from the cellular phone.

In the above-mentioned preferred embodiment, a description is made using a cellular phone. However, the description can also be applied to a portable terminal device, such as a PHS, etc.

As described above, according to the present invention, one-time only calls can be substantially prevented by always charging an originator for a one-time only call.

Then, even if there is a one-time only call, a receiver need not answer to the unpleasant call nor does the call disturb his/her work, etc.

What is claimed is:

1. A portable terminal device, comprising:
   a determination unit retrieving data from a telephone directory database if a call arrives at a portable terminal device, and determining whether an originating number is registered in the telephone directory database;
   a calling time monitoring unit monitoring a calling time between the arrival of the call and an issuance of a calling tone; and
   a transmitting unit immediately connecting the call before the issuance of the calling tone so that a charge is imposed on an originator side when the originating number is not registered in the telephone directory database, and announcing a prearranged recorded message, the transmitting unit issuing one or more of the calling tone before connecting the call when the originating number is registered as a predetermined type of originator in the telephone directory database, wherein
   a recorded message response time between the arrival of the call and the announcement of a recorded message is stored for each name registered in the telephone directory database, and
   an incoming recorded message response time is set for an incoming call by referring to the stored recorded message response time corresponding to the originating number when the originating number is registered in the telephone directory database.

2. The portable terminal device according to claim 1, wherein
   when the originating number is registered in the telephone directory database, the telephone directory database is further retrieved, and if the originating number is for a call set to a zero-calling time, the call is immediately connected before the issuance of the calling tone so that the charge is imposed on the originator side and the recorded message is announced to the originator.

3. The portable terminal device according to claim 1, wherein the zero-calling time setting is made in a recorded message response time area of the telephone directory database.

4. The portable terminal device according to claim 1, wherein after the recorded message is announced to the originator, a message from the originator is recorded.

5. A method for preventing one-time only calls to a portable telephone set, comprising:

retrieving data from a telephone directory database if a call arrives at a portable terminal device, and determining whether an originating number is registered in the telephone directory database;

monitoring a calling time between the arrival of the call and an issuance of a calling tone;

immediately connecting the call before the issuance of the calling tone when the originating number is not registered in the telephone directory database, and announcing a prearranged recorded message; and issuing one or more of the calling tone before connecting the call when the originating number is registered as a predetermined type of originator in the telephone directory database, wherein a recorded message response time between the arrival of the call and the announcement of a recorded message is stored for each name registered in the telephone directory database, and an incoming recorded message response time is set for an incoming call by referring to the stored recorded message response time corresponding to the originating number when the originating number is registered in the telephone directory database.

6. The method for preventing one-time only calls to a portable telephone set according to claim 5, wherein when the originating number is registered in the telephone directory database, the telephone directory database is further retrieved, and if the originating number is for a call set to a zero-calling time, the call is immediately connected before the issuance of the calling tone and the recorded message is announced to the originator.

* * * * *